United States Patent

Pinner et al.

[15] 3,648,163
[45] Mar. 7, 1972

[54] ELECTRICAL GROUND APPARATUS FOR TESTING THE QUALITY OF CONDUCTORS

[72] Inventors: Champ D. Pinner; Cecil E. Sligh; James L. Diehl; Wade H. Garland, Jr., all of Hartsville, S.C.

[73] Assignee: Sonoco Products Company, Hartsville, S.C.

[22] Filed: Dec. 2, 1969

[21] Appl. No.: 881,523

[52] U.S. Cl. .................................................. 324/51
[51] Int. Cl. ............................................... G01r 31/02
[58] Field of Search ................................................. 324/51

[56] References Cited

UNITED STATES PATENTS

| | | | |
|---|---|---|---|
| 2,806,993 | 9/1957 | Matousek | 324/51 |
| 2,858,507 | 10/1958 | Liautaud et al. | 324/51 X |
| 3,176,219 | 3/1965 | Behr | 324/51 |
| 3,368,146 | 2/1968 | Regan et al. | 324/51 |

FOREIGN PATENTS OR APPLICATIONS

| | | | |
|---|---|---|---|
| 423,691 | 2/1935 | Great Britain | 324/51 |
| 543,660 | 3/1942 | Great Britain | 324/51 |
| 771,537 | 4/1957 | Great Britain | 324/51 |
| 892,468 | 3/1962 | Great Britain | 324/51 |

*Primary Examiner*—Gerard R. Strecker
*Attorney*—Parrott, Bell, Seltzer, Park & Gibson

[57] ABSTRACT

Apparatus for testing the quality of an electrical ground conductor by completing a high-current low-voltage series circuit between the electrical ground conductor being tested and ground, and observing indicating means disposed in series therewith. Circuitry is provided for inducing this high-current low-voltage into the series circuit only when a normally open manually operable switch means is closed and only then, if there is continuity of the electrical ground conductor with ground.

11 Claims, 5 Drawing Figures

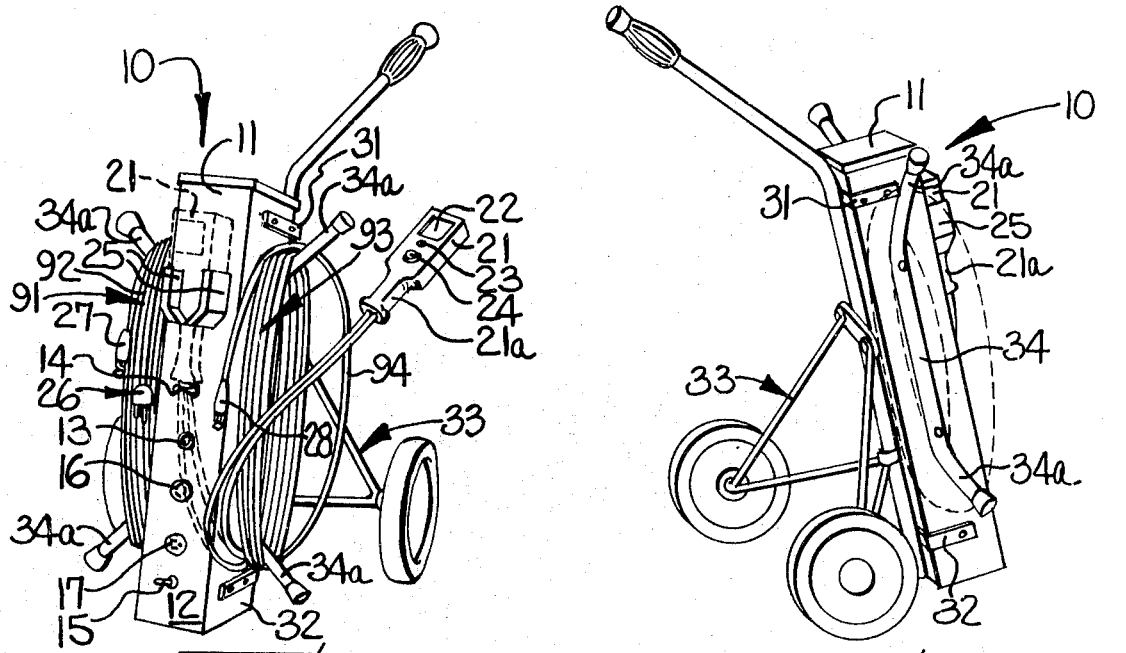
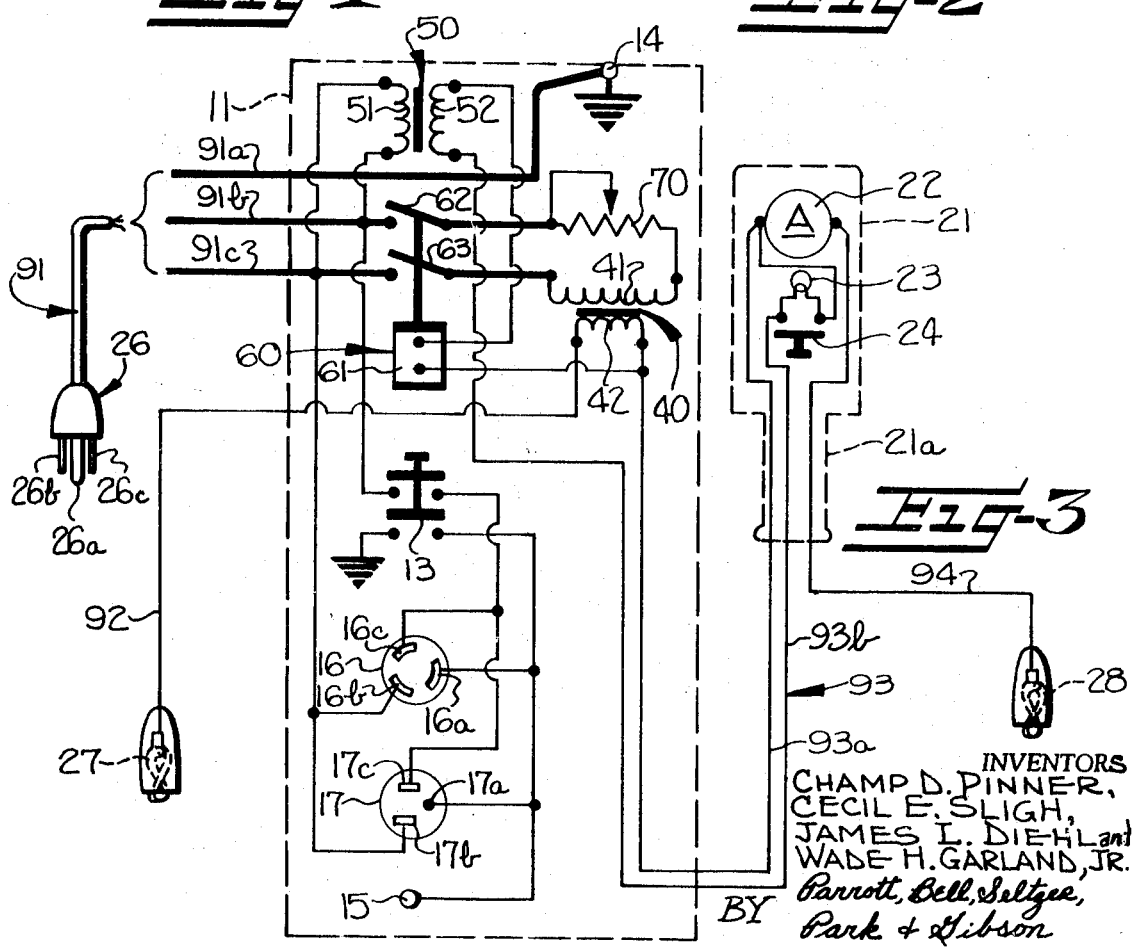

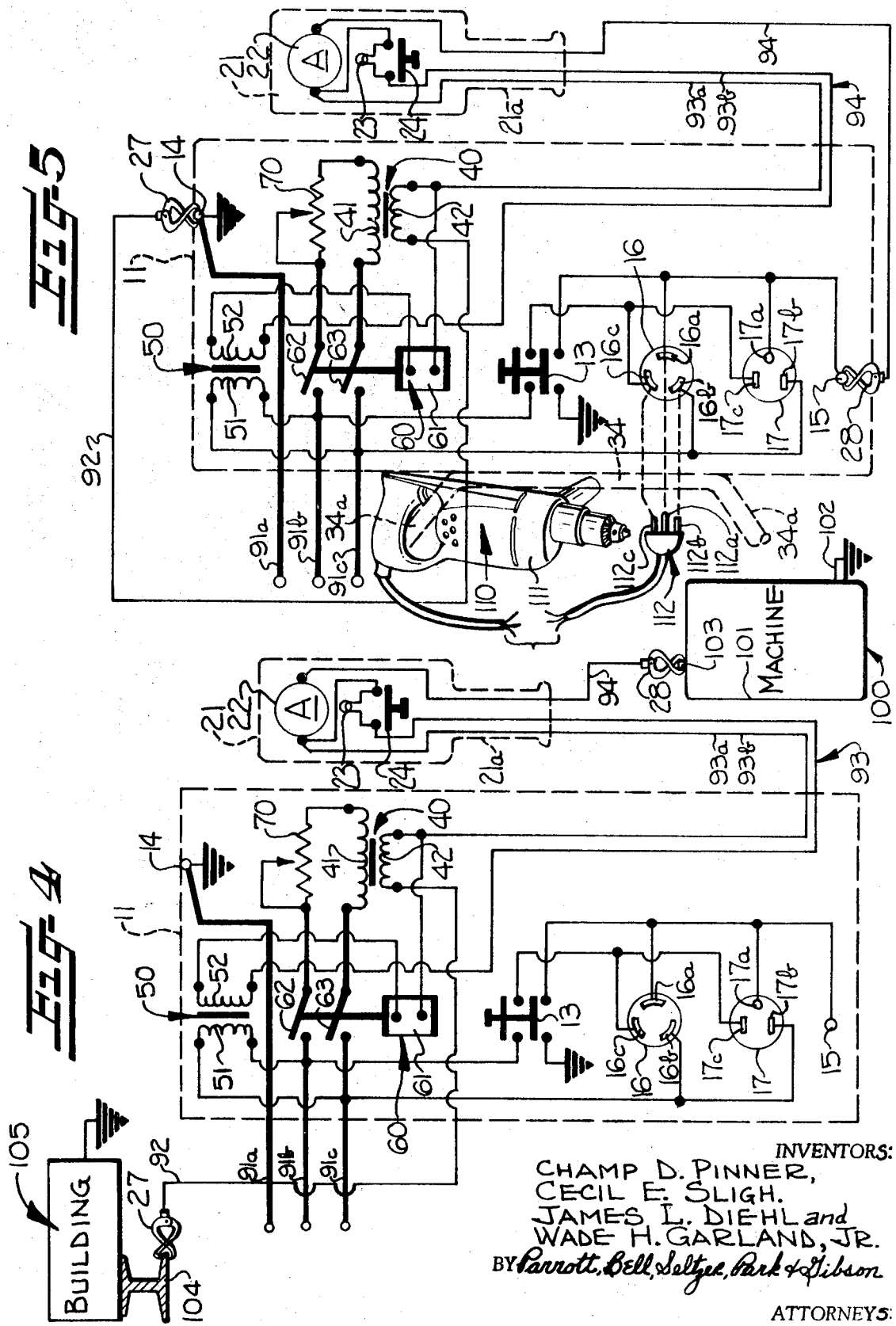

ELECTRICAL GROUND APPARATUS FOR TESTING THE QUALITY OF CONDUCTORS

This invention relates to an electrical tester for testing the quality of an electrical ground conductor having special utility in testing the quality of an electrical ground conductor of an electrically operated apparatus.

Most any type of electrically operated apparatus whether it be portable or otherwise, includes an electrically conductive housing which exposes the operator to extremely hazardous conditions which may result in his injury or even death. For instance, if an insulation breakdown occurs between the electrically conductive housing and the power-supply means, current may flow to ground through the operator causing his injury or death.

In order to minimize the chances of such a hazardous condition occurring, the housing is normally electrically connected to ground. Then, if an insulation breakdown should occur, current will tend to flow through the electrical ground conductor rather than through the operator, since the latter usually offers a higher resistance path. However, these hazards are not entirely eliminated since if the electrical ground conductor is broken or otherwise disconnected from the housing, the operator may still be subjected to possible injury or death. Similarly, should the electrically operated apparatus be incorrectly wired, the electrically operated apparatus may work satisfactorily and the danger not be realized until a hazard similar to that heretofore mentioned occurs. Thus, the utility of an electrical ground tester for testing the quality of the electrical ground conductor of an electrically operated apparatus cannot be overemphasized.

In addition, auxiliary electrically conductive housings having an electrical circuit associated therewith such as electrical conduits, switchboards and the like, preferably, include an electrical ground conductor to avoid the hazard above mentioned. Furthermore, it often times occurs that an electrical ground conductor may be connected by only a few strands of wire having a very low current carrying capacity that would be totally ineffective if such a hazard occurs. Thus it is highly desirable to be able to detect such faulty electrical ground connections.

Accordingly, it is an object of this invention to provide an electrical ground tester for testing the quality of an electrical ground conductor which is economical of manufacture, portable, easy to use and versatile in that it may be utilized in testing the quality of an electrical ground conductor whether it be to a permanently wired electrically operated apparatus, a portable electrically operated apparatus, an auxiliary electrically conductive housing having an electrical circuit associated therewith or even the ground conductor of an outlet receptacle.

By this invention, it has been found that the above object may be accomplished by providing an apparatus for testing the quality of an electrical ground conductor comprising a three-terminal receptacle plug including a ground terminal and two power-receiving terminals for connection to an outlet receptacle having a ground terminal and two power-supply terminals, respectively, the two receptacle power-supply terminals having an AC voltage therebetween, a first stepdown transformer having a primary winding and a higher current low-voltage secondary winding, a second stepdown transformer having a primary winding and a secondary winding, a relay having an actuating coil and normally open switch means which are closed when more than a predetermined amount of current flows through the relay-actuating coil, an electrically operated indicator means, a normally open manually operable switch means, first and second attachment means for electrical connection to the electrical ground conductor to be tested and ground. A first conductor means connects in series the normally open relay switch means, the two power-receiving terminals of the receptacle plug and the primary winding of the first transformer. A second conductor means connects in series the secondary winding of the first transformer, the electrically operated indicator means and the first and second attachment means. A third conductor means connects the primary winding of the second transformer and the two power-receiving terminals of the receptacle plug in series with each other and in parallel with the primary winding of the first transformer and the relay switch means. A fourth conductor means connects in series the secondary winding of the second transformer, the normally open manually operable switch means and the relay-actuating coil. Thus, when the first and second attachment means are electrically connected to the electrical ground conductor to be tested and ground and the manual switch means is closed, the indicator means will indicate the quality of the electrical ground conductor being tested.

Some of the objects of the invention having been stated, other objects will appear as the description proceeds, when taken in connection with the accompanying drawings, in which FIG. 1 is a perspective view of the electrical ground tester of the present invention;

FIG. 2 is a perspective view of the electrical ground tester of FIG. 1 looking in the opposite direction;

FIG. 3 is a schematic wiring diagram of the electrical ground tester of the present invention;

FIG. 4 is a schematic wiring diagram of the electrical ground tester as illustrated in FIG. 3 showing it being utilized for testing the quality of the electrical ground connection of the permanently wired electrically operated apparatus; and FIG. 5 is a schematic wiring diagram of the electrical ground tester as illustrated in FIG. 3 showing it being utilized for testing the quality of the electrical ground connection of a portable electrically operated apparatus.

Referring specifically to the drawings wherein like reference characters are employed to indicate like parts, there is illustrated in FIGS. 1-3 the electrical ground tester, generally indicated at 10, of the present invention.

The electrical ground tester comprises a casing 11 which is preferably formed of an electrically conductive material and has extending from its front panel 12 a double-pole normally open manually operable switch 13, a pair of studs 14 and 15, the latter of which is electrically insulated from casing 11, and a pair of electrical receptacles 16 and 17 all of which are included in the electrical circuitry of the electrical ground tester 10. Each of the electrical receptacles 16 and 17 are of the three-terminal type and have a ground terminal 16a and 17a and two power-supply terminals 16b, 16c and 17b, 17c, respectively, and differ only in that they are adapted to receive different types of receptacle plugs of electrically operated apparatus to be tested.

The electrical ground tester 10 also includes a portable enclosure 21 having a handgrip portion 21a. The portable enclosure 21 has an electrically operated indicator means mounted therein, namely, an ammeter 22 which is so mounted as to be visually observable from the exterior thereof, a warning lamp 23 and a pushbutton normally open manually operated switch 24 mounted adjacent handgrip portion 21a for operation by an operator holding the portable enclosure 21. The ammeter 22, warning lamp 23 and pushbutton switch 24 form part of the electrical circuitry of the electrical ground tester 10. It will be noted that a pair of spaced-apart projections 25 are mounted on front panel 12 of casing 11 with lower portions converging toward each other so that when not in use portable enclosure 21 may be stored in the space defined between projections 25 as illustrated by phantom lines in FIG. 1.

The electrical ground tester 10 further includes a three-terminal receptacle plug 26 having a ground terminal 26a and two power-receiving terminals 26b and 26c which may be connected to a suitable outlet receptacle (not shown) also having a ground terminal and two power-supply terminals, respectively, for supplying a single phase 110–125 AC voltage between the two power-receiving terminals 26b and 26c. The three terminals 26a, 26b, and 26c of receptacle plug 26 also form part of the electrical circuitry of the electrical ground tester 10 of the present invention and enable power to be supplied thereto.

Furthermore, the electrical ground tester 10 comprises first and second attachment means 27 and 28 which may take on any suitable form such as that of an alligator clip as illustrated in FIG. 3 for electrical connection to the electrical ground conductor to be tested and ground. Attachment clips 27 and 28 also form a part of the electrical circuitry of the electrical ground tester 10.

While the casing 11 may be of any configuration that may conveniently house the electrical circuitry shown in FIG. 3, the casing 11 is preferably elongate and has a substantially uniform cross section so that the casing 11 may be readily mounted as by brackets 31 and 32 on a portable frame such as that of a pull golf cart, generally indicated at 33. In addition, the elongate casing 11 preferably has generally U-shaped support members 34 mounted longitudinally on opposed sides thereof with the leg portions 34a extending outwardly therefrom so that the various cables connecting various parts of the electrical ground tester 10 with the casing 11 may be stored on the support member 34 as illustrated in FIG. 1 when the electrical ground tester 10 is not in use. Furthermore, the support members 34 are preferably electrically conductive and provide support means for supporting a portable electrically operated apparatus that may be tested with the electrical ground tester 10 of the present invention in electrical contact with casing 11.

Referring now to FIG. 3 the electrical circuitry of the electrical ground tester will be described. Within the casing 11, the electrical circuitry includes a first stepdown transformer, generally indicated at 40, having a primary winding 41 and a high-current low-voltage secondary winding 42, a second stepdown transformer, generally indicated at 50, having a primary winding 51 and a secondary winding 52, a relay, generally indicated at 60, having an actuating coil 61 and normally open switches 62 and 63 which are closed when more than a predetermined amount of current flows through the actuating coil 61, and a variable resistor 70.

A flexible three-wire conductor cable 91 consisting of a ground conductor 91a and two power conductors 91b and 91c extends from receptacle plug 26 and connects the ground terminal 26a and the two power-receiving terminals 26b and 26c, respectively, with the electrical circuitry within casing 11. The ground conductor 91a connects the ground terminal 26a to ground stud 14 which is electrically connected to casing 11, thus, grounding casing 11. Power conductor 91b connects power-receiving terminal 26b through relay switch 62 and variable resistor 70 to one side of the primary winding 41 of transformer 40 and power conductor 91c connects power-receiving terminal 26c through relay switch 63 to the other side of the primary winding 41 of transformer 40. One side of the secondary winding 42 of transformer 40 is connected by a single-wire conductor cable 92 to attachment clip 27. A two-wire conductor cable 93 consisting of conductors 93a and 93b extends from casing 11 to the portable enclosure 21 with conductor 93a connecting the other side of the secondary winding 42 to one terminal of ammeter 22.

The primary winding 51 of the transformer 50 is connected in series with power conductors 91b and 91c and in parallel to relay switches 62 and 63 and the primary winding 41 of the first transformer 40. The secondary winding 52 is connected in series with the actuating coil 61 of relay 60 and warning lamp 23. It will be noted that conductors 93a and 93b of cable 93 are employed to connect the warning lamp 23 in series therewith. The pushbutton normally open switch 24 is adapted to short circuit warning lamp 23 for reasons to be later explained.

The incomplete series circuit including the attachment clip 27, the secondary winding 42 of the first transformer 40 and the ammeter 22, further includes a single-wire conductor cable 94 which connects the unconnected terminal of ammeter 22 to attachment clip 28. It is this latter incomplete series circuit that serves as the test circuit.

By way of example ammeter 22 may have a full scale value of 30 amps, warning lamp 23 may be a 6-volt lamp, the first and second transformers may have 110–125-volt primary windings and 6-volt and 8-volt secondary windings, respectively, with variable resistor 70 being adjustable so that when the attachment clips 27 and 28 are short circuited and pushbutton switch 24 is closed to short circuit warning lamp 23, ammeter 22 will read 25 amps.

With component values as set out above, when power is being supplied through power-receiving terminals 26b and 26c and pushbutton switch 24 is open, the voltage induced in the secondary 52 of transformer 50 is sufficient to cause a current flow to light warning lamp 23 but not sufficient through actuating coil 61 to close relay switches 62 and 63. Thus, even though the attachment clips 27 and 28 may be short circuited or grounded, current will not be flowing through the secondary winding 42 of the first transformer 40 and attachment clips 27 and 28. Even though the attachment clips 27 and 28 are electrically connected to an electrical ground conductor to be tested, the testing will not begin until the pushbutton switch 24 is closed, thereby retaining control of the beginning and duration of the test in the operator of the tester 10. When the pushbutton switch 24 is closed to short circuit the warning lamp 23, the current then flowing in the relay-actuating coil 61 will be sufficient to close relay contacts 62 and 63, permitting a current to flow in resistor 70 and the primary winding 41 of transformer 40. This current will in turn cause a voltage to be induced in the secondary 42 of transformer 40, and the voltage will cause the flow in the test circuit a current whose magnitude and behavior will indicate the condition of a ground connection or any other connection between clips 27 and 28.

The electrical circuitry further includes conductors connecting the ground terminals 16a and 17a of receptacles 16 and 17, respectively, to test stud 15 that extends out from the front panel 12 of casing 11 and which is insulated therefrom. The ground terminals 16a and 17a are also connected through the lower pole of double-pole manually operable switch 13 to ground. The power supply terminals 16b and 17b are connected directly to power conductor 91c and power supply terminals 16c and 17c are connected through the upper pole of double-pole switch 13 to power conductor 91b. It will be apparent that the connections of the power-supply terminals 16b, 16c, 17b and 17c to power conductors 91b and 91c may be interchanged to control their polarity. Thus, when double-pole switch 13 is open, ground terminals 16a and 17a are connected to test stud 15 and when double-pole switch 12 is closed, the ground terminals 16a and 17a in addition to being connected to test stud 15 are connected to ground and the power-supply terminals 16b, 16c and 17b, 17c have power fed thereto.

The utilization of the electrical ground tester 10 of the present invention is illustrated in FIGS. 4 and 5 for testing the ground of a permanently wired electrically operated machine and a portable electrically operated handtool such as an electrical drill, respectively. Referring specifically to FIG. 4, a permanently wired electrically operated machine, generally indicated at 100 having an electrically conductive housing 101 and a safety ground conductor 102 normally connected to ground is being tested. After having connected receptacle plug 26 to a 110–125 AC voltage source such an outlet receptacle (not shown), the attachment clips 27 and 28 are short circuited as by connecting them together and pushbutton switch 24 is closed to induce a high-current low voltage in the test circuit. Variable resistor 70 may then be adjusted to vary the current flow therein to a desirable amount such as 25 amps after which pushbutton switch 24 is released to deenergize the test circuit. Then, attachment clip 28 is electrically connected to the housing 101 as at 103 of the electrically operated machine 100. The other attachment clip 27 is electrically connected to true ground as by connecting it to a truss 104 of the building 105 or other suitably grounded portion thereof. At this time no current will be induced in the test circuit. When the quality of the ground connection of the housing 101 of the electrically operated machine 100 is to be tested, pushbutton switch 24 is closed and ammeter 22 observed. If the ammeter 22 indicates no current flow or low-current flow (5 or less amps), the housing 101 of the electrically operated machine 100 is inadequately grounded and the machine 100 should not be utilized until the inadequate ground has been corrected. If the ammeter 22 initially indicates a high-current flow (15 to 20 amps) and then a rapid drop, the grounding connection is heating and should be checked for a loose connection or frayed wires. On the other hand, if the ammeter 22 continuously indicates a high-current flow (20 amps) the housing 101 is properly grounded and the machine 100 may be used in safety. It should be emphasized that pushbutton switch 24 should not be closed for prolonged periods of time, since high current through good ground conductors may cause damage thereto.

With reference to FIG. 5, a portable electrically operated drill, generally indicated at 110, having an electrically conductive housing 111, and a receptacle plug 112 which includes a ground terminal 112a and two power-receiving terminals 112b and 112c is being tested. As before, after having connected receptacle plug 26 to a 110–125 AC voltage source such as an outlet receptacle (not shown), the attachment clips 27 and 28 are short circuited as by connecting them together and pushbutton switch 24 is closed to induce a high-current low voltage in the test circuit. Variable resistor 70 may then be adjusted to vary the current flow therein to a desirable amount such as 25 amps. The housing 111 of the portable drill 110 to be tested is positioned on a leg portion 34a of a support member 34 as in FIG. 5 and the receptacle plug 112 thereof is connected to the appropriate receptacle 16 and 17. In the present instance, the receptacle plug 112 of the drill 110 is connected to receptacle 16 as illustrated with ground terminal 112a connecting with ground terminal 16a and the power-receiving terminals 112b and 112c connecting with power-supply terminal 16b and 16c, respectively. Then, attachment clips 27 and 28 are electrically connected to ground stud 14 and test stud 15, respectively. From the foregoing description it will be apparent that the electrically conductive housing 111 of drill 110 is in electrical contact with attachment clip 27 through support member 34, casing 11 and ground stud 14. It will also be apparent that ground terminal 112a of receptacle plug 112 is electrically connected to attachment clip 28. Thus, the drill 100 and electrical ground tester 10 are connected for testing the quality of the ground connection between housing 111 and the ground terminal 112a of the receptacle plug 112. The test is carried out in the same manner as described for the permanently wired electrically operated apparatus and therefore, the actual testing will not be described.

While the foregoing is one procedure that may be employed in testing the quality of a ground connection between the housing 111 of drill 110 and the ground terminal 102a of the receptacle plug 112, the housing 111 of drill 110 need not be physically placed in electrical contact with support member 34 or the receptacle plug 112 connected to receptacle 16. The criticality in the testing is that attachment clips 27 and 28 be electrically connected to the housing 111 and to ground terminal 112a of receptacle plug 112. However, if the foregoing connections are made the operability of the drill 110 may be readily tested by closing switch 13 and actuating the actuating means (not shown) typically included in such portable electrically operated apparatus.

While the electrical ground tester 10 is particularly adapted for testing the quality of an electrical ground connection of a permanently wired or portable electrically operated apparatus, the ground tester 10 may be utilized to test any ground connection by making suitable electrical connections that will be readily apparent to one skilled in the art. Due to the physical construction of the electrical ground tester 10 and the various conductor cables connecting the various parts thereof, it is readily apparent that the tester 10 may be utilized to test ground connections at most any location with convenience. This is particularly true in that the attachment clips 27 and 28 and portable enclosure 21 which contains the ammeter 22 and pushbutton switch 24 may be extended to great distances from the casing 11 and the tester 10 repeatedly used without return to the casing 11.

In the drawings and specification, there has been set forth a preferred embodiment of the invention, and although specific terms are employed, they are used in a generic and descriptive sense only and not for purposes of limitation.

What is claimed is:

1. An electrical ground tester for various types of electrically operated apparatus having an electrically conductive housing and a safety ground conductor normally connected thereto, said tester comprising a three-terminal receptacle plug including a ground terminal and two power-receiving terminals for connection to an outlet receptacle having a ground terminal and two power-supply terminals, respectively, said receptacle power-supply terminals having an AC voltage therebetween, a first stepdown transformer having a primary winding and a high-current low-voltage secondary winding, a second stepdown transformer having a primary winding and a secondary winding, a relay having an actuating coil and normally open switch means which are closed when more than a predetermined amount of current flows through said actuating coil, an electrically operated indicator means, a normally open manually operable switch means, first and second attachment means for electrical connection to the housing of the electrically operated apparatus to be tested and ground, first conductor means connecting in series said primary winding of said first transformer, the two power-receiving terminals of said receptacle plug and said normally open relay switch means, second conductor means connecting in series the secondary winding of said first transformer, said electrically operated indicator means and said first and second attachment means, third conductor means connecting in series the primary winding of said second transformer, and the two power-receiving terminals of said receptacle plug, said primary winding of said second transformer being in parallel to the primary winding of said first transformer and said relay switch means, fourth conductor means connecting in series the secondary winding of said second transformer, said normally open manually operable switch means, and said relay actuating coil, whereby when the first and second attachment means are electrically connected to the housing of the electrically operated apparatus to be tested and ground and said manual switch means is closed, said indicator means will indicate the quality of the electrical ground connection for the housing of the electrically operated apparatus being tested.

2. The electrical ground tester as set forth in claim 1 including a variable resistor connected in series with the two power-receiving terminals of said receptacle plug and the primary winding of said first transformer for controlling the current flow induced in the secondary winding of said first transformer when the primary winding of said first transformer is energized by the closing of said normally open relay switch means.

3. The electrical ground tester as set forth in claim 1 for testing an electrically operated apparatus having an electrically conductive housing and a receptacle plug which includes a ground terminal and two power-receiving terminals, said tester further comprising a three-terminal receptacle having a ground terminal and two power-supply terminals for receiving the receptacle plug of the electrically operated apparatus to be tested, and means for connecting the ground terminal of said receptacle to said second attachment means whereby when said first and second attachment means are electrically connected to the housing of the electrically operated apparatus to be tested and said ground terminal connecting means and said manual switch is closed, said indicator means will indicate the quality of the ground connection between the housing and the ground terminal of the receptacle plug of the electrically operated apparatus being tested.

4. The electrical ground tester as set forth in claim 3 including
a second normally open manually operable switch,
a third normally open manually operable switch,
conductor means connecting in series the two power-supply terminals of said receptacle, the two power-supply terminals of said receptacle plug and said second normally open manually operable switch, and
conductor means having said third normally open manually operable switch in series therewith connecting the ground terminal of said receptacle to ground whereby an operating voltage may be supplied to the electrically operated apparatus by closing said second and third manually operable switches.

5. The electrical ground tester as set forth in claim 4 including
means for supporting the housing of the electrically operated apparatus to be tested in electrical contact with the ground terminal of said receptacle plug whereby when said first and second attachment means are electrically connected to the ground terminal of said receptacle plug and said ground terminal connecting means, and said first normally open manually operable switch is closed, said indicator means will indicate the quality of the electrical ground connection between the housing and the ground terminal of the receptacle plug of the electrically operated apparatus being tested.

6. The electrical ground tester as set forth in claim 1 wherein said indicator means comprises an ammeter.

7. An electrical ground tester for various types of electrically operated apparatus having an electrically conductive housing and a safety ground conductor normally connected thereto comprising
an electrically conductive casing,
a three-terminal receptacle plug extending from said casing and including a ground terminal and two power-receiving terminals for connection to an outlet receptacle having a ground terminal and two power-supply terminals, said two power-supply terminals having a AC voltage therebetween,
a first stepdown transformer mounted within said casing and having a primary winding and a high-current low-voltage secondary winding,
a second stepdown transformer mounted within said casing and having a primary winding and a secondary winding,
a relay having an actuating coil and normally open switch means which are closed when more than a predetermined amount of current flows through said actuating coil, said coil and switch means being mounted in said casing,
a portable enclosure,
an electrically operated indicator means carried within said enclosure and observable from the exterior thereof,
a normally open manually operable switch means also carried within said enclosure and operable from the exterior thereof,
first and second attachment means for electrical connection to the housing of the electrically operated apparatus to be tested and ground,
first conductor means connecting in series said primary winding of said first transformer, the two power-receiving terminals of said receptacle plug and said normally open relay switch means,
second conductor means connecting in series the secondary winding of said first transformer, said indicator means and said first and second attachment means, said second conductor means including a conductor means extending from one of said attachment means into said portable enclosure and to one side of said indicator means and another conductor means extending from one side of said secondary winding of said first transformer into said portable enclosure and to the other side of said indicator means,
third conductor means connecting in series the primary winding of said second transformer, and the two power-receiving terminals of said receptacle plug, said primary winding of said second transformer being in parallel to both the primary winding of said first transformer and said relay switch means,
fourth conductor means connecting in series the secondary winding of said second transformer, said manually operable switch means, and said relay-actuating coil, and said fourth conductor means including conductor means extending from said manually operable switch means out of said portable enclosure and into said casing to said relay-actuating coil and said secondary winding of said second transformer,
whereby when the first and second attachment means are electrically connected to the housing of the electrical apparatus to be tested and ground and said manual switch is closed, said indicator means will indicate the quality of the electrical ground connection for the housing of the electrically operated apparatus being tested and also whereby said portable enclosure, with its indicator means and its manually operable switch means may be moved from place to place, without necessarily moving the casing, to the extent permitted by the length of the conductor means extending between said casing and said portable enclosure.

8. The electrical ground tester of claim 7 wherein said indicator means is an ammeter and said manual switch is a pushbutton switch and including; a variable resistor mounted within and insulated from said casing, said resistor being connected in series with the two power-receiving terminals of said receptacle plug and the primary winding of said first transformer for controlling the current flow induced through said ammeter when said relay switch means is closed.

9. The electrical ground tester as set forth in claim 8 for testing an electrically operated apparatus having an electrically conductive housing and a receptacle plug which includes a ground terminal and two power-supply terminals further comprising
means for supporting the housing of the electrically operated apparatus to be tested in electrical contact with said casing, said casing being in electrical contact with the ground terminal of said receptacle plug,
whereby when said first and second attachment means are electrically connected to said casing and the ground terminal of the receptacle plug of the electrically operated apparatus being tested and said manual switch is closed, said indicator means will indicate the quality of the electrical ground connection between the housing and the ground terminal of the receptacle plug of the electrically operated apparatus being tested.

10. An electrical ground tester for testing the quality of an electrical ground conductor, said tester comprising a casing containing a first transformer and a second transformer, each transformer having a primary winding and a secondary winding, a receptacle plug for connecting said primary winding of said second transformer to a source of alternating current, first and second attachment means connected to opposite sides of said secondary winding of said first transformer for electrically connecting true ground and the ground conductor in series with said secondary winding of said first transformer, an electrically operable current indicating means in series with and interposed between said secondary winding of said first transformer and one of said attachment means, a normally open manually operable switch means, an electrically operable warning means adjacent said switch means, conductor means connecting said electrically operable warning means and said normally open manually operable switch means in parallel with each other but in series with said secondary winding of said second transformer whereby said warning means is energized upon connection of said receptacle plug to said source of current when said manually operable switch means is open and also whereby said manually operable switch means, when closed, short circuits said warning means, electrically operable responsive means interposed in said conductor means in series between said secondary winding of said second transformer and both said warning means and said manually operable switch means, and said responsive means including means responsive to closing said manually operable switch means or electrically connecting the primary winding of said first transformer to said source through said receptacle plug whereby, when said first and second attachment means are connected to said true ground and the ground conductor to be tested and said manually operable switch means is closed, said indicating means will indicate the quality of the electrical ground afforded by the electrical ground conductor, and whereby said warning means serves to indicate that said receptacle plug is connected to said source of alternating current when said manually operable switch means is open.

11. An electrical ground tester according to claim 10, wherein said responsive means is contained in said casing, said tester further comprising a portable enclosure, said current indicating means, said manually operable switch means and said warning means being mounted in said portable enclosure, and said conductor means having a substantial length thereof extending between said casing and said enclosure whereby an operator may move said current indicating means, said manually operable switch means and said warning means from place to place with said enclosure for testing the quality of ground conductors remote from said casing without necessarily moving the casing during such testing.

* * * * *